April 15, 1952 P. C. DURLAND 2,592,875
METHOD AND MACHINE FOR SHAPING LOBED FORMS
Filed Feb. 18, 1949 7 Sheets-Sheet 1
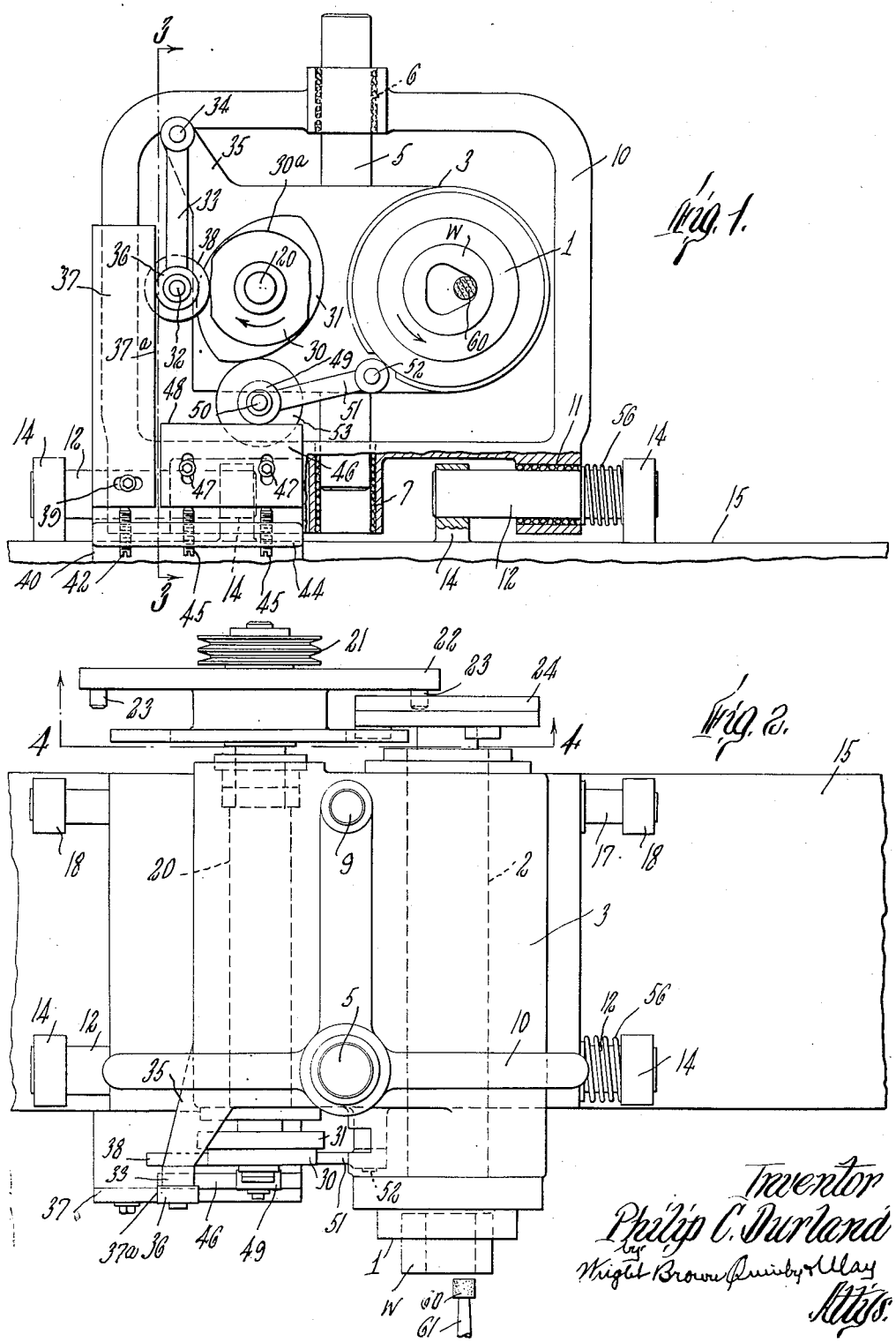

April 15, 1952      P. C. DURLAND      2,592,875

METHOD AND MACHINE FOR SHAPING LOBED FORMS

Filed Feb. 18, 1949      7 Sheets-Sheet 2

Inventor
Philip C. Durland
by Wright Brown Quinby May
Attys

April 15, 1952 P. C. DURLAND 2,592,875
METHOD AND MACHINE FOR SHAPING LOBED FORMS
Filed Feb. 18, 1949 7 Sheets-Sheet 3
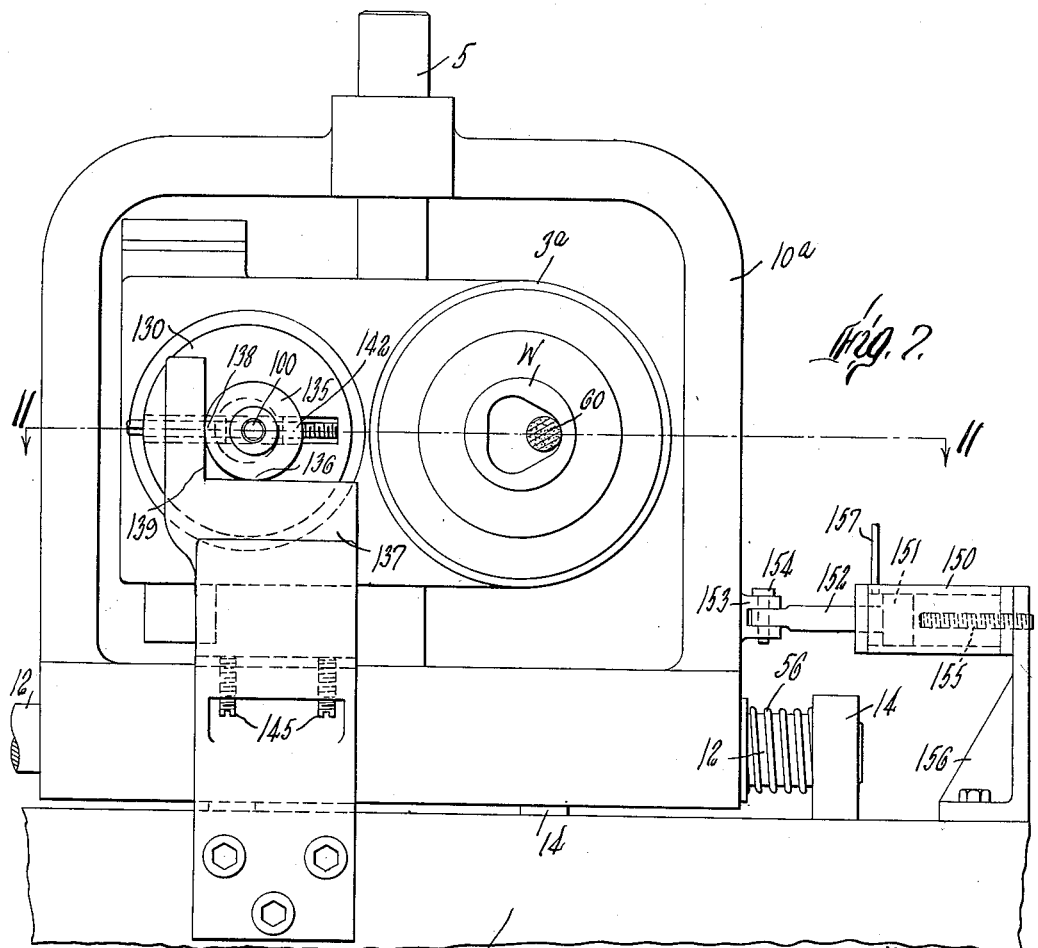
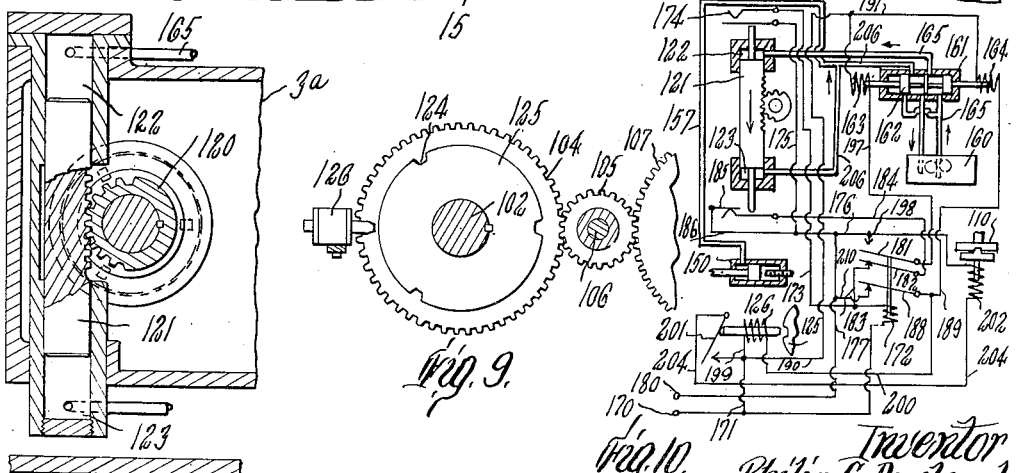
Inventor
Philip C. Durland April 15, 1952   P. C. DURLAND   2,592,875
METHOD AND MACHINE FOR SHAPING LOBED FORMS
Filed Feb. 18, 1949   7 Sheets-Sheet 4

Inventor
Philip C. Durland

April 15, 1952         P. C. DURLAND         2,592,875
METHOD AND MACHINE FOR SHAPING LOBED FORMS
Filed Feb. 18, 1949         7 Sheets-Sheet 5

Inventor
Philip C. Durland

April 15, 1952 P. C. DURLAND 2,592,875
METHOD AND MACHINE FOR SHAPING LOBED FORMS
Filed Feb. 18, 1949 7 Sheets-Sheet 6

Inventor
Philip C. Durland
Wright, Brown, Quinby & May
Attys.

April 15, 1952 P. C. DURLAND 2,592,875
METHOD AND MACHINE FOR SHAPING LOBED FORMS
Filed Feb. 18, 1949 7 Sheets-Sheet 7

Inventor
Philip C. Durland

Patented Apr. 15, 1952

2,592,875

UNITED STATES PATENT OFFICE 2,592,875

METHOD AND MACHINE FOR SHAPING LOBED FORMS

Philip C. Durland, Springfield, Vt., assignor to Bryant Chucking Grinder Company, Springfield, Vt., a corporation of Vermont Application February 18, 1949, Serial No. 77,183

14 Claims. (Cl. 51—93)

1

In order to provide for maximum torque transmission between the shaft and pulleys or other parts secured thereto, it has been found desirable to provide a shaft having in cross section lobes of curved section joined by straight faces or flats, commonly there being three such lobes, and to provide a similarly shaped hole to fit the shaft, in these parts intended to be carried thereby.

One object of the present invention is to provide means for accurately forming holes in such parts for engagement on shafts of such contour and also, if desired, to accurately shape the external contour of the shaft for engagement therein, and to face off or form shoulders thereon.

A further object is to provide a grinding machine in which the grinding operation is so guided as to produce parts of the desired contours whether internal or external, the grinding operation as is well known, being capable of producing high accuracy parts particularly in hard materials and thus being particularly suitable for use in connection with the problems incident to the manufacture of lobed shafts and elements adapted to engage thereon.

While this invention is not limited to the production of work having any specific number of lobes in the contour, the usual construction is to employ three such lobes, and the invention will be further described more particularly with relation to machines for producing three lobe contours.

For a complete understanding of this invention, reference may be had to the accompanying drawings in which Figure 1 is an end elevation shown somewhat diagrammatically of a grinding machine designed for internal grinding of three lobe contours.

Figure 2 is a top plan view of the same.

Figure 7 is a view similar to Figure 1, but showing a modification.

Figures 8, 9 and 12 are detail sectional views on correspondingly numbered section lines of Figure 11.

Figure 10 is a diagram of the control circuit for the machine of Figures 7 to 12.

2

Figure 13:
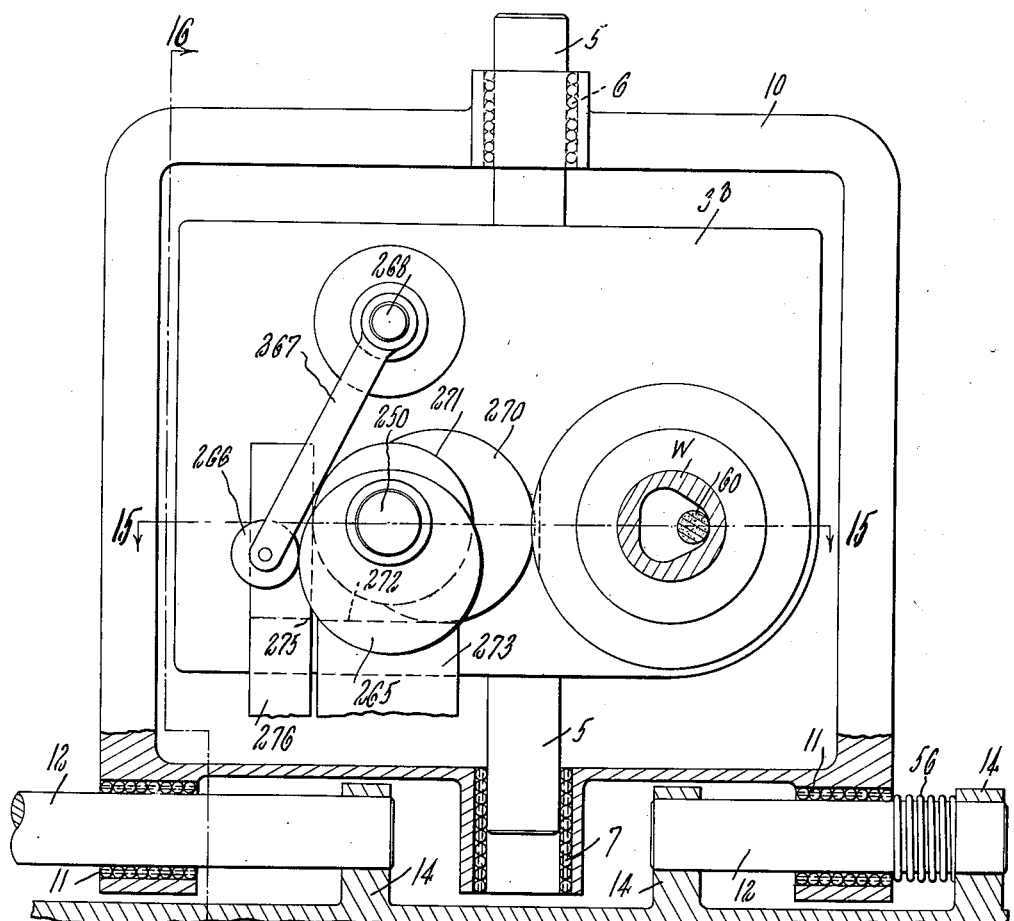

Figure 13 is a view partly in end elevation and partly broken away and in section showing a further modification.

Figure 14:
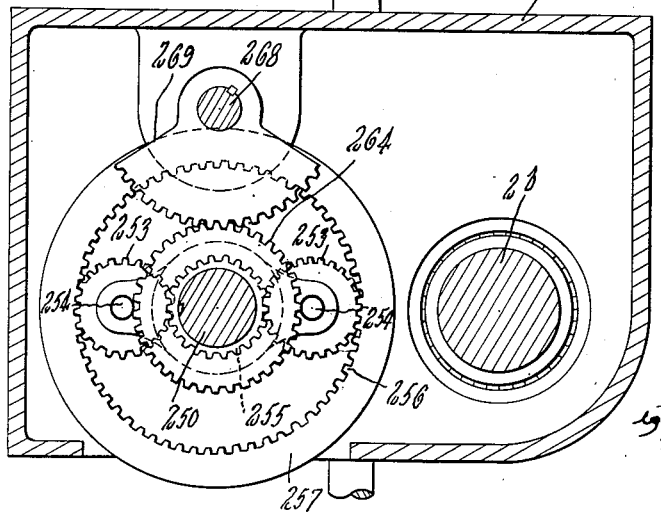

Figure 14 is a sectional view on line 14—14 of Figure 13.

Figure 15:
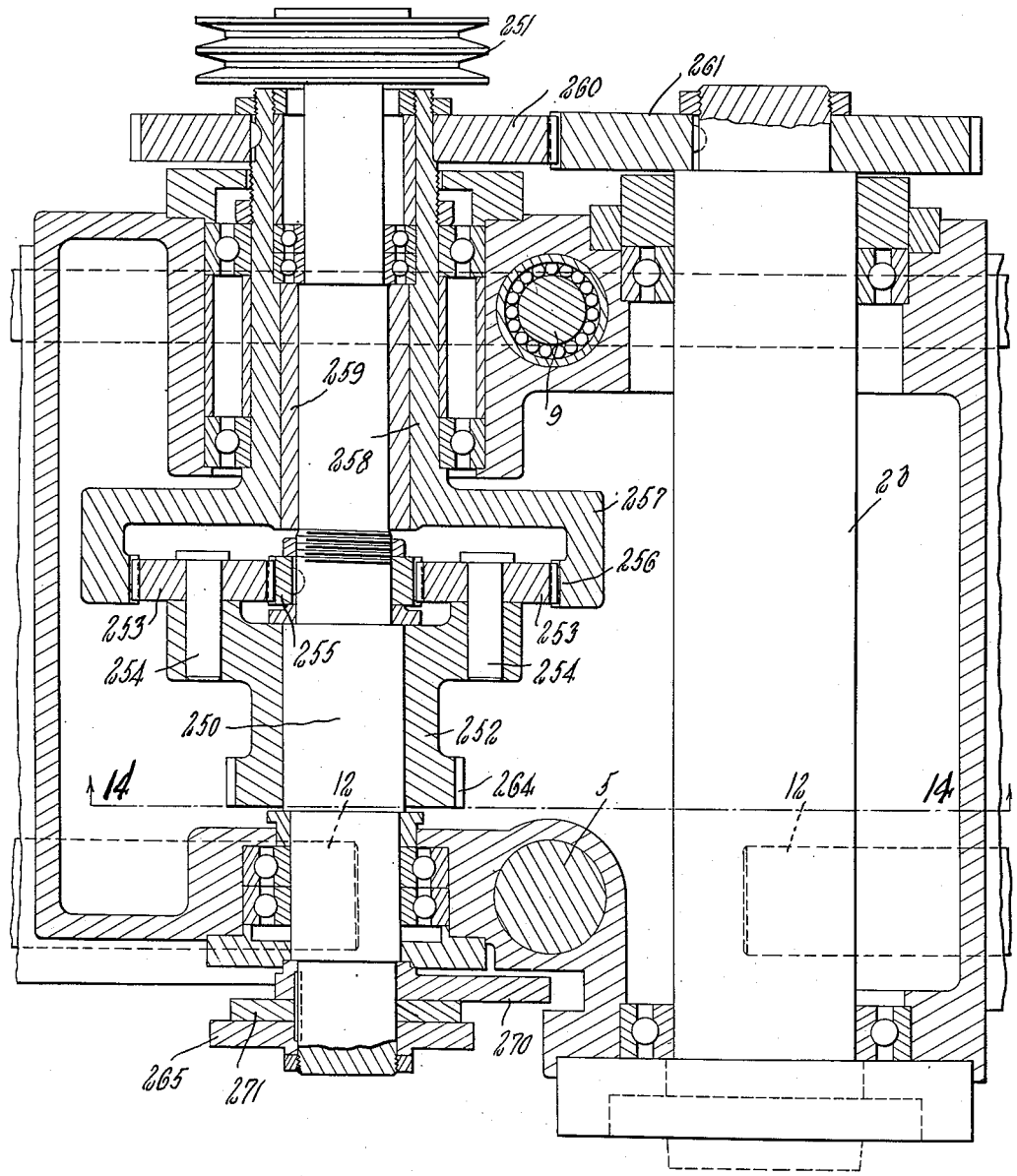
Figure 16:
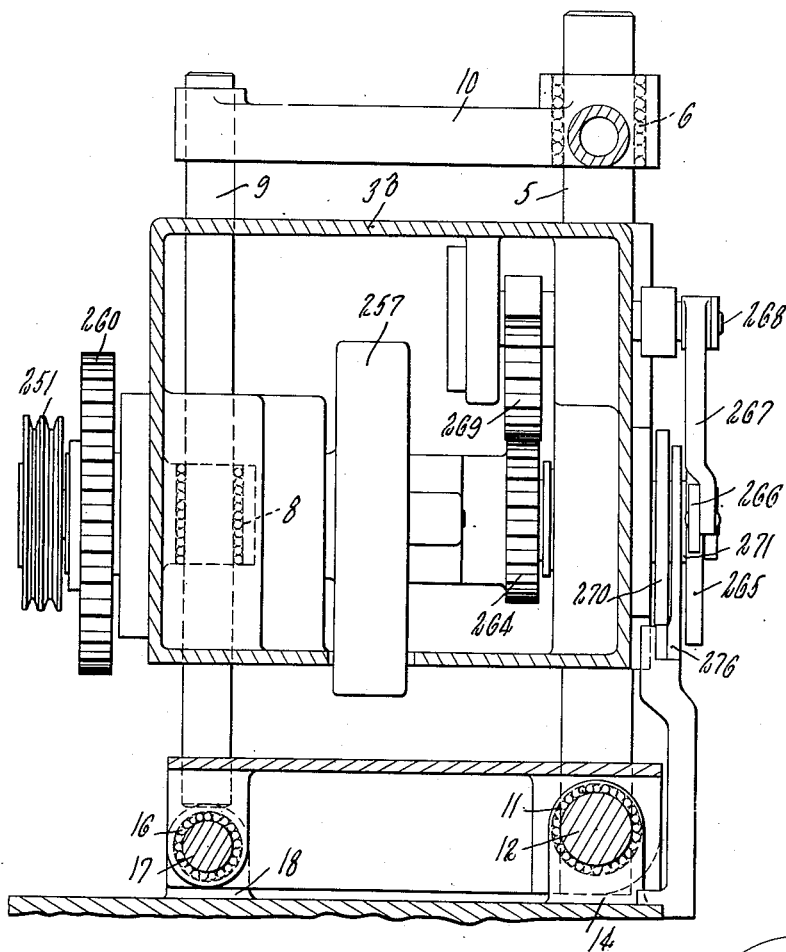
Figure 17:
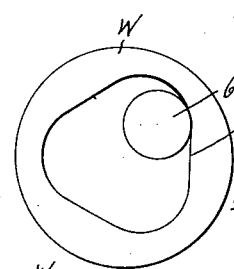
Figure 18:
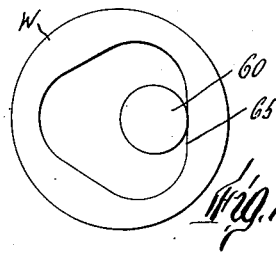

Figures 15 and 16 are sectional views on lines 15—15 and 16—16, respectively, of Figure 13.

Figures 17 to 22, inclusive, are diagrammatic sectional views showing the path of motion of the grinding wheel relataive to the work for grinding internal tri-lobe holes.

In order to carry out the desired grinding operation, means are provided in accordance with this invention for moving the work past the grinding wheel in a straight path while a flat side face of the work is being operated upon, after which the work piece is rotated for one-third of a revolution while a curved portion of the configuration is being operated upon, this alternate straight and curved path being followed throughout the circumference of the work. The center of curvature of a lobed surface of the work ground does not coincide with the axial center of the work, so that turning of the work about its axis is accompanied by a bodily motion of the work of such magnitude and path as to result in a turning of the work about the axis of curvature of the curved surface of the work being ground.

Referring first to the construction shown in Figures 1 to 4, the work to be ground, herein shown as internal work at W, is carried by a suitable chuck 1 mounted in any suitable manner upon a rotary work spindle 2. This work spindle 2 is journaled in a carriage 3. The carriage 3 is mounted for motion in a plane transverse to the axis of the work spindle. For this purpose it is shown as supported for motion in two paths at right angles to each other. For motion in one of these paths, the carriage 3 is provided with a vertical bar 5 supported above and below the carriage in a pair of ball bearings 6 and 7. The carriage is also provided with an intermediate ball bearing 8 (see Figure 3) parallel to the ball bearings 6 and 7, but which bears upon a stationary vertical post 9. This mounting provides a three-point support for vertical motion of the carriage 3 within a supporting frame 10.

The supporting frame 10 in its turn is mounted for horizontal motion. This motion is provided for by a pair of axially spaced ball bearings 11 on a pair of straight and axially alined bars 12 mounted in brackets 14 extending upwardly from a bed 15. Spaced horizontally from axial alinement with the bearings 11 is a single ball bearing 16 mounted in the supporting frame 10 and movable along a guide bar 17 arranged parallel to the bars 12. This bar 17 is fixed in brackets 18 carried by the bed 15. The carriage is thus mounted for both vertical and horizontal motions in paths at right angles to each other and these paths are both at right angles to the axis of the spindle 2.

Also journaled in the carriage 3 and parallel to the spindle 2 is a rotary drive shaft 20. This drive shaft is provided at one end, as at its rear end, with a belt pulley 21 by which it may be rotated. Adjacent to the belt pulley 21 it carries a disk 22 provided with a pair of Geneva crank arms 23 which are arranged to cooperate with a slotted Geneva wheel 24 secured to the rear end portion of the spindle 2. For grinding three-lobe forms, this Geneva wheel 24 is provided with three Geneva slots 25 spaced 120° apart and at each half revolution of the drive spindle 20, one of the Geneva arms 23 acts to turn the spindle through one-third only of a revolution during 60° rotation and also to hold the spindle stationary while the drive spindle rotates through 120°, lugs 26 on the Geneva wheel then riding on the periphery of a notched disk 27 carried by the disk 22, as shown in dotted lines in Figure 4.

The forward end of the shaft 20 is provided with a pair of cams 30 and 31. The cam 30 bears against a roll 38 journaled on a shaft 32 carried at the lower end of a link 33 which is fulcrumed at its upper end as at 34 to an upwardly and forwardly extending arm 35 of the carriage 3. The shaft 32 also has journaled thereon a roller 36 which bears against the vertical edge 37a of a plate 37. The lower end of the plate 37 is secured as by a screw and slot connection at 39 to a bracket 40 secured to the bed 15 as by screws 41 (see Figure 3). Beneath it may bear an adjusting screw 42 threaded through an extension 44 of the bracket 41. This bracket extension 44 also carries a pair of adjusting screws 45 which bear against the lower face of an abutment plate 46, likewise secured to the bracket 40 as by screw and slot connections at 47. This plate 46 has a flat top face 48 on which rides a follower roll 49 journaled on a shaft 50 carried by a link 51 pivoted at 52 on the carriage 3. This shaft 50 also carries a follower roll 53 against which rides the cam 31 also carried by the drive shaft 20.

The carriage 3 is normally held pressed to the left to hold the follower roll 36 into contact with the vertical face 38 as by a coil spring 56 surrounding one of the bars 12 and pressing the frame 10 away from the adjacent bearing 14. The follower roll 49 is held against the top face of the cam plate 46 by reason of the weight of the carriage and the parts carried thereby which ride thereon through the cam 31.

The cam 31 is provided with two high and low points and when rotating in the direction of the arrow of Figure 1 from the point shown until a low point of the cam 31 engages the follower 53, the carriage 3 descends. At the same time the cam 30 which is pressed against the follower 38 and which presses the roll 36 against the vertical face 37a acts and in the position shown has permitted the spring 56 to move the carriage to the left, and is about to start a motion to the right. Both of these actions take place while the indexing motion of the work spindle is taking place, the parts being shown midway of the indexing motion.

Figure 19:
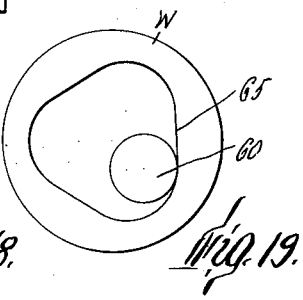
Figure 20:
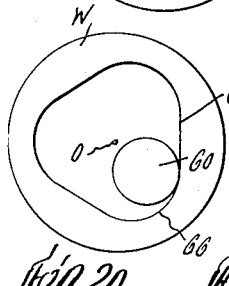
Figure 21:
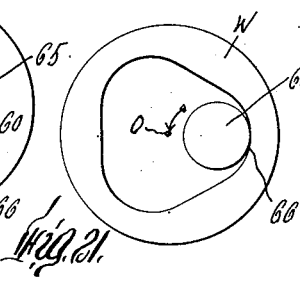
Figure 22:
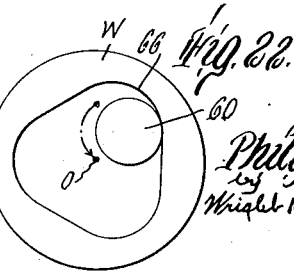

Assuming that the work piece W is hollow, and it is desired to internally grind it to a three-lobe contour, a rotary grinding wheel 60, carried by a spindle 61 parallel to the work spindle, the wheel being of a diameter not greater than the diameter of the curvature of the lobe, is presented to the work piece, suitable means (not shown) being employed to feed the wheel into the work and to dress it when necessary, all as is well known in the art. During the indexing action which causes the work piece to be turned about its own axis throughout 120°, the carriage is being lowered and at the same time is being given a motion, first to the left and then to the right. At the start of the indexing motion, the grinding wheel 60 is in the position shown in Figure 20 at the lower end of one of the straight faces 65 of the lobe form and at the start of grinding the curved portion 66 thereof. The spindle axis is shown at O in these figures. As the work is turned about the spindle axis O, this axis O is moved throughout an arcuate path by the action of the cam mechanisms on the carriage 3, the motion first being to the left, as shown in Figure 21, while the work piece lowers. From the midpoint of the arc 66, which is the position of the machine as shown in Figures 1 to 4, inclusive, the turning motion proceeds, accompanied by a continued downward motion of the work piece, but also by a motion of the work piece to the right, completing the travel of the central point of the axis O of the work piece through the arcuate path shown by the curved arrow A in Figure 22. The work piece is now at its lowest limit of motion with the grinding wheel at the top of a straight or flat portion of the contour. The turning motion of the spindle now terminates and the grinding wheel grinds the flat which is now arranged vertically, thus being accomplished by moving the carriage upwardly, unaccompanied by any lateral motion. This is produced by the cam 31 bearing on the roll 53, and a concentric portion 30a of the cam 30 now bearing on the roll 38. The work piece thus raises, going successively to the positions shown in Figures 17, 18 and 19 until it reaches the start of the succeeding arcuate portion of the contour. This position, as shown in Figure 19, is the same as that shown in Figure 20. A second turning motion of the work spindle through the Geneva motion then begins, this being accompanied by an in and out horizontal motion and a downward vertical motion of the work piece which acts to cause the grinding wheel to grind the succeeding lobed portion of the contour. This alternate action during which the spindle is rotated through 120° and is given a vertical motion in one direction and horizontal motion first in one and then in the other direction and then the spindle while stationary angularly is given a vertical motion in one direction only without a horizontal motion in either direction is then repeated, this causing the grinding action to take place throughout the successive lobes and flats of the contour. The extent of horizontal and vertical motions required depends upon the diameter of the curved portion of the lobes formed and the length of the straight faces.

Figure 3:
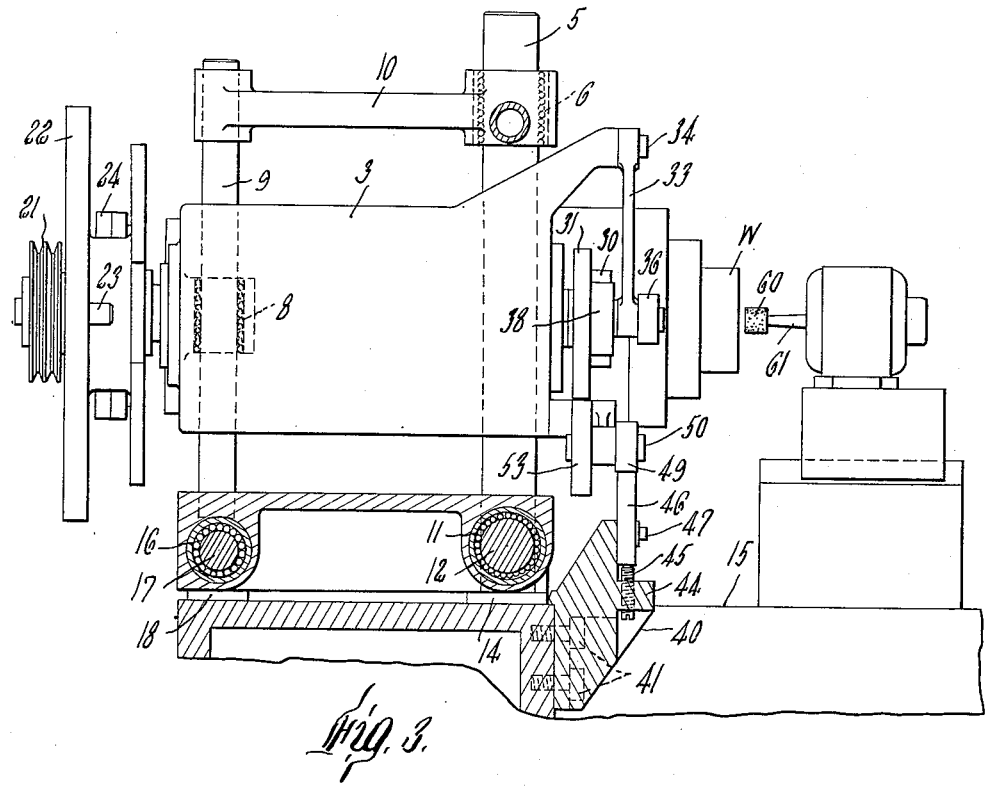
Figure 3 is a sectional view on line 3—3 of Figure 1.
Figure 4:
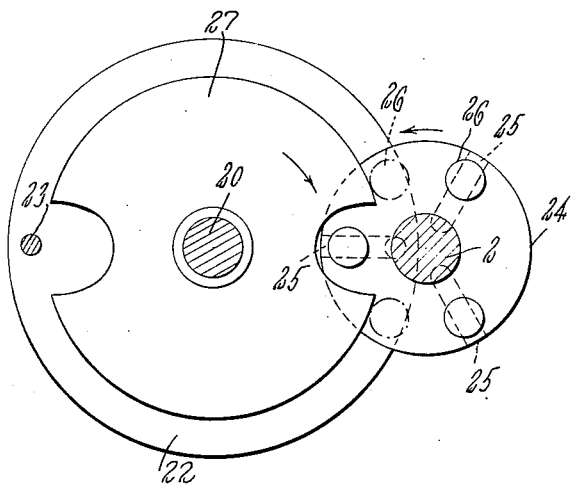
Figure 4 is a detail sectional view on line 4—4 of Figure 2.
Figure 5:
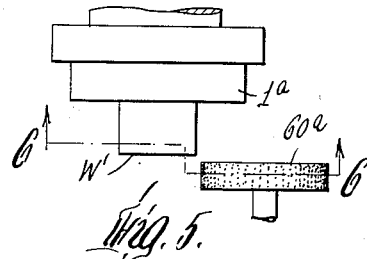
Figures 5 and 6 are fragmentary top plan and elevational views, respectively, showing arrangements for external grinding.
Figure 6:
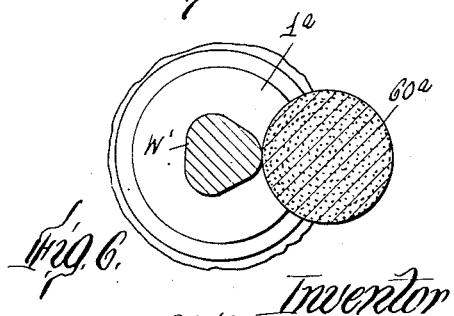
Figure 11:
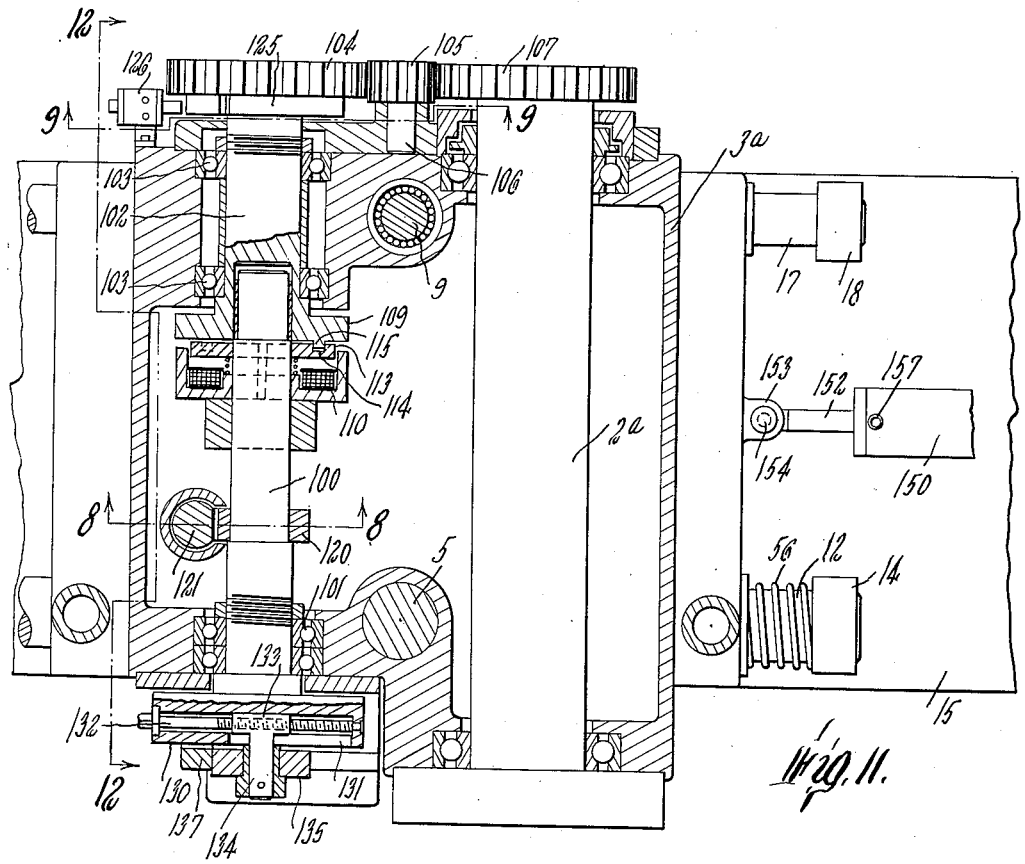
Figure 11 is a sectional view on line 11—11 of Figure 7.
Figure 12:
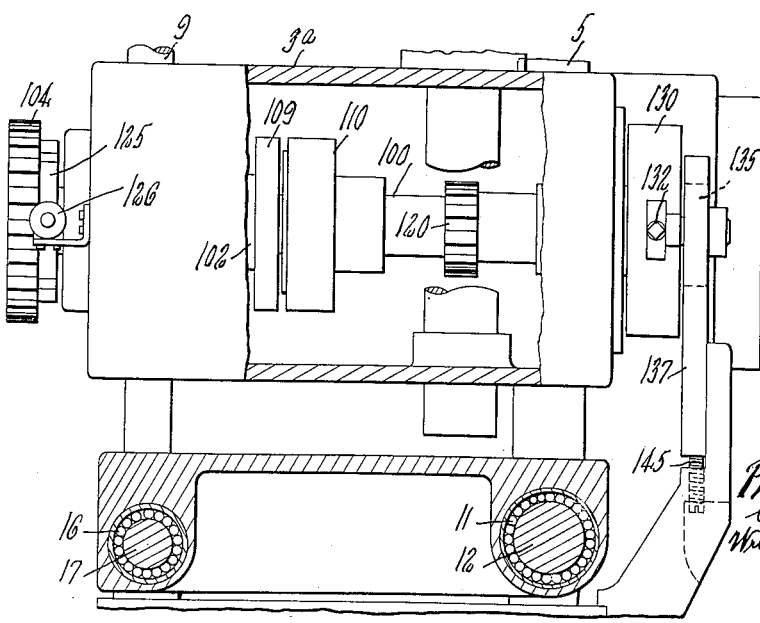

Similar action takes place where it is desired to grind an external lobe form, it being only necessary, as shown in Figures 5 and 6, to employ an external grinding wheel 60a positioned to grind the outside of the work piece W' carried by the chuck 1a. The motions of the work piece with reference to the grinding wheel for external work are the same as for internal work. The end face of the grinding wheel may be used to face work or to grind shoulders in external work forming stops to limit the axial motion of internally lobed elements placed thereon.

In Figures 7 to 12 there is shown a modification in which the intermediate rotations of the work spindle are produced by a different mechanism. Referring to these figures, the work spindle 2a is journaled in the carriage 3a which is mounted for vertical and horizontal motion in the same manner as is the carriage 3 of Figures 1 to 3, and at the forward end this spindle 2a carries a suitable chuck for holding the work. Since the mounting of the carriage for vertical and horizontal motion is the same as that for the form shown in Figures 1 to 3, similar reference characters are employed for the mounting parts.

In place of the rotary shaft for driving the mechanism, including means for rotating the spindle intermittently at the proper times, in this form of the machine there is illustrated a rock shaft 100 journaled in a ball bearing 101 at its forward end and having a rear end extending into the forward extremity of a shaft 102 journaled in spaced bearings 103 in the rear portion of the carriage. This shaft 102 is provided with a gear 104 at its rear end meshing with a pinion 105 carried on a stub shaft 106, which, in turn, meshes with a gear 107 carried at the rear end of the work spindle 2a. The shafts 101 and 102 may be connected at suitable times for simultaneous rotation by means of a normally closed electrically released clutch 110. Energization of this clutch draws a clutch plate 113 carried by the rock shaft 100 out of engagement with the mating clutch plate 109 which is formed integral with the shaft 102. For three-lobe forms the clutch plate 113 has three equally angularly spaced notches 114 cooperating with a single lug 115 carried by the clutch plate 109. This provides for clutching engagement between the parts at any selected of three definite angular positions spaced from each other by 120°. The shaft 100 is arranged to be rocked alternately in opposite directions. For this purpose it is provided with a gear segment collar 120 (see Figures 8 and 11) with which mesh rack teeth on a plunger 121, the upper and lower ends of which form pistons riding in pressure cylinders 122 and 123.

When the shaft 102 is not coupled through the clutch with the shaft 100, means are provided for locking it against rotation. This means comprises a solenoid-retracted spring-projected latch 126 (see Figures 9 and 11) which may engage in any one of three locking notches 124 in the periphery of a disk 125 keyed to the shaft 102. For other than three-lobe forms, the number and angular spacing of the locking notches would be changed accordingly. The forward end of the shaft 100 carries a hylindrical drum 130 provided with a slot 131 in its forward face back of which is mounted a threaded bar 132, which can be turned through a suitable tool engaging a squared extremity. The threads of this bar engage a slide 133 which extends out through the slot 131 and is provided with a pivot portion 134. On this pivot portion is mounted an eccentric 135. This eccentric has two portions in different angular parts thereof, the one at 136 bearing against the top face of a cam plate bracket 137 and the other at 138 bearing against a vertical face 139 on the same bracket. The cam plate bracket 137 may be adjusted to bring its vertical and horizontal faces into accurate relation by adjustment of the supporting or jack screws 145. The eccentric portion 138 is pressed against the vertical wall 139 as by the spring 56 similar to the same spring in the construction shown in Figures 1 to 3, but means are provided by which the carriage may be held to the right where it is pressed by the high point 142. This may comprise the fluid pressure cylinder 150 provided with a piston 151 therein connected through a piston rod 152 to a forked lug 153 extending from the frame 10a, the piston rod being connected to the lugs as through a pin 154. An adjustable stop screw 155 carried by a bracket 156 which supports the cylinder 150 extends into the rear end of the cylinder and acts as a stop to limit the motion to the right of the piston 151. Fluid under pressure may be admitted to the right of the piston 151 or discharged therefrom through the pipe 157.

In Figure 10 is illustrated the mechanism by which the various parts of this machine are actuated and controlled. Fluid under pressure is derived from a suitable source 160, herein shown as a fluid pressure pump, taking fluid and pumping it to a valve casing 161. This valve casing has a valve 162 therein, the position of which within the cylinder is controlled by a pair of solenoids 163 and 164. In the position shown with the member 121 in mid-position of its downward stroke corresponding to the position in Figures 7 and 8, fluid under pressure passes from the pressure pipe 165 to the valve casing 162 and through the pipe 166 to the pressure cylinder 122 at the upper end of the plunger 121, thus to drive this plunger downwardly, rocking the shaft 100 as it does so. At the start of this down stroke when the switch 174 is closed by the member 121 current from a suitable source passes from the lead 170 through the coil of relay 172, lead 173, closed switch 174, leads 175, 176 and 177 to the line 180. This closes the relay 172. Closing of this relay 172 opens one switch 181 and closes two switches 182 and 188. The opening of the switch 181 opens a circuit through the solenoid 163 so that the reversing valve is free to be thrown to the right hand position shown in Figure 10. Closing of the switch 182 of the relay 172 energizes a holding circuit for the relay 172 across the switch 174 so that when the switch 174 opens as the member 121 moves out of contact with it the relay 172 remains closed. This holding circuit is from line 170 through a coil of relay 172, lead 183, closed switch 182 of the relay 172, lead 184, switch 185 and leads 186 and 177, back to the line 180. The closing of the switch 188 of the relay 172 closes a circuit from the line 170 through leads 171, 190 and 191, solenoid 164, lead 189, closed switch 188 of the relay 172, leads 210, back to the line 180. Closing of the switch 188 also energizes the latch solenoid 126, releasing the latch. This circuit is from the line 170 through lead 171, latch solenoid 126, lead 200, switch 188 and leads 210 and 177 back to line 180. The energization of the solenoid 164 moves the reversing valve 162 into the right hand position shown, which admits fluid pressure to the top of the cylinder 122 and starts the motion of the member 121 downwardly. Just after the movement of this member starts, the normally open switch 174 is allowed to open, but the holding circuit for relay 170 holds this relay closed causing the energization of the coil 164 of the reversing valve. The clutch 110 is closed and the locking detent 126 is retracted so that the spindle is now turning and both cam portions 138 and 136 are effective to move the carriage. The grinding wheel is now grinding a curve of one of the lobes. This continues until the member 121 reaches the bottom of its stroke, where it impinges upon and opens the switch 185. This interrupts the holding circuit through the switch 182 of the relay 172, which immediately opens. The opening of this relay closes the switch 181 and opens the switches 182 and 188. Closing of the switch 181 energizes the solenoid 163 which reverses the position of the reversing valve 161 and starts the upward motion of the member 122. Thus the closing of the switch 181 establishes a circuit from the line 170 and through leads 171, 190 and 191, the solenoid 163 of the reversing valve, lead 197, closed switch 181 of the relay 172, and leads 198, 176, and 177, back to the line 180. The opening of the switch 188 deenergizes the detent solenoid 126, allowing its spring to project it into one of the notches 124. This locks the spindle 2a against rotation. Projection of the latch at 126 closes a switch 201 and the closing of this switch 201 energizes the clutch solenoid 202, opening the clutch 119 in the spindle drive. This is done by establishing a circuit from the line 170, through lead 171, closed switch 201, lead 204, clutch solenoid 202, and leads 176 and 177, back to the line 180. As soon as the member 121 starts to rise, the switch 185 closes, but nothing further happens until the member 121 reaches the top of its stroke and closes the switch 174, which starts repetition of the cycle. As the motion of the member 121 starts upward, fluid pressure passes from the pipe 206 which leads to the bottom cylinder 123, through the pipe 157 and into the cylinder 150, so that the piston 151 is driven to the right to its limit, holding the carriage 3a to its right hand limiting position so that the cam portion 138 is ineffective to permit or cause the carriage to move laterally, while the cam portion 135 is effective to lift the carriage, thus to cause the grinding wheel to traverse a flat on the work contour.

Still another machine for producing the same contour grinding is illustrated in Figures 13 to 16. In these figures a carriage 3b is mounted for vertical and horizontal motions in the same manner as previously described for the carriage 3 and 3a. This carriage 3b has journaled therein the work-carrying spindle 2b. Also journaled in the work carriage 3b parallel to the spindle is a rotary drive shaft 250 which may be provided, as at its rear end, with a suitable rotating means such as a belt pulley 251. This shaft 250 has journaled thereon a cage 252 which has journaled thereon a pair of pinions 253, as on the pivot pins 254. These pinions 253 mesh with a gear 255 keyed to the shaft 250 and they also mesh with an internal gear 256 which may be formed integral with an enlarged diameter portion 257 of a sleeve 258 journaled on a bushing 259 carried by the shaft 250. This sleeve 258 at its rear end carries a gear 260 which meshes with a gear 261 keyed to the rear end of the spindle 2b. The cage 252, together with its pinions 253, which mesh with the gear 255 on the shaft 250 and with the gear 256 on the sleeve 259, constitute a planetary gear drive interposed between the rotary shaft 250 and the gear 260 which drives the spindle 2b, and with such an arrangement rotation imparted in one direction to the cage 252 will serve to increase the rate of speed of the sleeve 258 as the shaft 250 is rotated, and motion of the cage in the opposite direction will serve to decrease such speed. In accordance with the present invention this decrease of speed is made such as to completely nullify the rotation of the spindle 250 at certain intervals during which the flats on the work are being ground, while between these intervals the spindle is rotated during the desired portions of a revolution, this portion being one-third of a revolution where three-lobe forms are to be ground. The turning of the cage in these two directions is produced by the action of a cam or eccentric 265 secured to the forward end of the shaft 250. This cam 265 acts upon a follower roll 266 journaled at the lower end of an arm 267 (see Figure 13). The upper end of this arm 267 is secured to a rock shaft 268. This rock shaft 268 extends backwardly into the carriage 3b and opposite to the gear 252 it has fixed thereto a segmental gear 269 which meshes with the gear 264 on the cage 252. The follower roll 266 rests by gravity against the periphery of the cam 265, or, if desired, it may be pressed thereagainst as by a spring (not shown), and as this cam 265 rotates, the arm 267 is caused to swing through an arc. During one direction of motion its speed with reference to the speed of rotation of the shaft 250 is such that the cage 252 is rocked in a direction and at a rate to nullify the rotation of the shaft 250 in so far as producing motion of the sleeve 258 is concerned, so that the spindle 2b is held from rotation, while during the opposite direction of swing of the arm 267, the sleeve 258 is turned at a faster rate than the shaft 250, and produces a turning of the spindle 2b in the desired direction through the desired fractional portion of a complete rotation.

The forward end of the shaft 250 also carries two other cams or eccentrics 270 and 271. The cam 270 rides upon a horizontal surface 272 of a controlling plate 273 and produces the desired vertical motion of the work, upward motion of the work being produced while the spindle is stationary to grind a flat of the work, while downward motion of the work is produced during the grinding of the curved lobe surface. This downward motion of the work is also accompanied by a horizontal motion in opposite directions which is produced by the engagement of the cam 271 against a vertical surface 275 of a vertical control plate 276. The cam 271 is held against this vertical surface 275 as by the spring 56 and this cam 271 has a concentric portion which engages the face 275 during that portion of the rotation of the shaft 250 when the flat is being ground, at which time the spindle 2b is not rotating.

In all these machines it will be understood that external as well as internal grinding of lobe forms may be produced, the motions of the work being the same in both cases, an internal grinding wheel of at least as small a radius as the radius of curvature of the lobes being employed for internal grinding and an external grinding wheel of any desired radius being employed for external grinding, the feed motions of the grinding wheels toward the work being in opposite directions, depending upon whether internal or external grinding is to be accomplished.

From the foregoing description of certain embodiments of this invention, it will be evident to those skilled in the art that various further changes and modifications might be made without departing from its spirit or scope.

I claim:

1. The method of cutting a contour comprising straight and arcuate faces, which comprises relatively moving the work and a cutting tool in a straight path in one direction while the work is angularly stationary to cut one of said straight faces, and then rotating the work about an axis spaced from the axis of curvature of the adjacent curved face while returning the work in said straight path and in opposite directions in a path at right angles to said first mentioned straight path in relative magnitudes and directions to cause said tool to describe the adjacent arcuate face to the next adjacent flat face in the direction of relative progress of the tool around said contour, and repeating the process throughout the circumference of said contour.

2. In a machine of the class described, a rotary work spindle mounted for motion transverse to its axis, a work holder carried by said spindle, a rotary grinding wheel on an axis parallel to said spindle and in operative relation to work carried by said holder, means for moving said work spindle in said transverse direction, means for rotating said spindle, and means controlling such spindle motion in a cycle comprising intermittent rotary motions about the axis of said spindle and bodily motions thereof in curved and straight paths respectively, the curved and straight paths being such as to cause the line of engagement between said wheel and work spindle to describe circular arcs each of a fractional part of a circle and said straight paths being such as to join the ends of adjacent arcs with straight line motions all forming a closed figure symmetrical about said spindle axis.

3. A machine of the class described comprising a bed, a carriage mounted for motion on said bed in two rectilinear paths at right angles to each other, a work spindle journaled in said carriage at right angles to both of said paths, a rotary grinding wheel carried on an axis parallel to said spindle axis in position to operate on work carried by said spindle, means for intermittently turning said spindle through a portion only of a revolution at each actuation, means acting during each turning motion of said spindle to move said carriage bodily in one and then in the other direction in one of said paths and in one direction only in the other of said paths at such relative speeds that the line of contact between said grinding wheel and work describes a circular arc of a lobe, and means acting during the intervals between successive turnings of said spindle to move said carriage in the opposite direction in said other path to cause the line of contact between said wheel and the work to generate a flat between successive lobes of the work.

4. A machine of the class described, comprising a bed, a carriage mounted for motion on said bed in two linear paths at right angles to each other, a work spindle journaled in said carriage at right angles to both of said paths, a rotary grinding wheel carried on an axis parallel to said spindle axis and in operative relation to work carried by said spindle, means for supporting work on said spindle, a rotary drive shaft journaled in said carriage parallel to said spindle, means driven by said shaft for intermittently turning said spindle through a portion only of a revolution at each actuation, means driven by said shaft and acting during such spindle turning to move said carriage in one and then in the other direction in one of said paths and in one direction only in the other of said paths to cause the resultant motion of the work to be angular motion about the axis of curvature of a lobe, and means actuated by said shaft during the intervals between turning of said spindle to move said carriage in one direction only in the other of said paths to cause a flat between lobes to be moved past the grinding face of said grinding wheel.

5. A machine as described in claim 4 wherein the driving connection between said rotary drive shaft and spindle comprises a Geneva motion.

6. A machine as claimed in claim 4 wherein the driving connections between said rotary shaft and said carriage for moving said carriage in said paths comprise cam mechanisms.

7. A machine as claimed in claim 3 wherein the means which acts to move said carriage comprises a rock shaft, means for rocking said shaft in opposite directions, a pair of cam mechanisms actuated by the rocking of said rock shaft, and means for holding one of said cam mechanisms inoperative during the intervals between the angular motions of said spindle while the other of said cam mechanisms continues in operation.

8. A machine as described in claim 3 in which the means which acts to move said carriage comprises a rock shaft, a reciprocable member connected to said rock shaft for rocking said rock shaft by reciprocation of said member, clutch mechanism for clutching said rotary shaft to said spindle for turning said spindle by rotation of said rotary shaft, means for locking said spindle against turning when said clutch mechanism is inoperative, power means for reciprocating said member, means actuated by said member adjacent to its limits of motion for reversing the direction of motion of said member and for actuating said clutch mechanism and locking means, and means actuable to hold one of said cam mechanisms inoperative during intervals while said clutch is open.

9. A machine as described in claim 8 wherein there is provided a fluid pressure means for reciprocating said member, fluid pressure means actuable to hold one of said cam mechanisms inoperative, a valve controlling said fluid pressure means, electrical means actuated by said member adjacent to its limits of motion for actuating said valve to reverse the direction of motion of said member and to actuate said clutch mechanism and locking means, and to actuate said fluid pressure actuated holding means to hold one of said cam mechanisms inoperative while said clutch is open.

10. A machine of the class described, comprising a bed, a carriage mounted for motion on said bed in two rectangular paths at right angles to each other, a work holding spindle journaled in said carriage at right angles to both of said paths, a rotary grinding wheel carried on an axis parallel to said spindle, a rotary shaft journaled in said carriage, a cage journaled on said shaft, a gear fixed to said shaft, pinions journaled on said cage and meshing with said gear, a sleeve journaled coaxially with said shaft, a gear carried by said sleeve and meshing with said pinions, rotary driving connections from said sleeve to said spindle, means timed with the rotation of said shaft for turning said cage alternately in opposite directions at a rate such that during one direction of turning of said cage said sleeve is stationary and during the other direction of turning of said cage said spindle turns through a part only of one revolution, means actuated by the rotation of said shaft while said spindle is stationary to move said carriage in one direction only in one only of said paths and to move said carriage in the opposite direction only in said one path and in both directions in the other of said paths during the turning of said spindle in such relation that said grinding wheel describes a circular arcuate path through successive intermittent portions of a complete rotation with intermediate straight connecting paths joining said arcuate paths.

11. A machine of the class described comprising a bed, a carriage mounted for motion on said bed in two rectilinear paths at right angles to each other, a work holding spindle journaled in said carriage at right angles to both of said paths, a grinding wheel carried on an axis parallel to said spindle and in position to act upon a work piece carried by said spindle, a rotary shaft journaled in said carriage, means for rotating said spindle from said shaft comprising planetary gearing including a cage journaled on said shaft, a gear fixed to said shaft, pinions journaled on said cage and meshing with said shaft gear, a sleeve mounted for rotation coaxial with said shaft, a gear carried by said sleeve and meshing with said pinions, rotary driving connections from said sleeve to said spindle, a rock shaft journaled in said carriage parallel to said rotary shaft, a gear segment carried by said rock shaft and meshing with said cage-carried gear, cam mechanism driven by said rotary shaft for rocking said segment in opposite directions at a rate to cause intermittent turning of said spindle through portions only of a complete revolution and with interposed idle periods, cam mechanism actuated by said rotary shaft to move said carriage in one direction in one only of said paths while said spindle is idle, and cam means actuated by rotation of said rotary shaft while said spindle is turning to move said carriage in the opposite direction in said one path and in each of opposite directions in said other path in relation to cause said grinding wheel to grind circular curves each of a portion only of a circumference on the work and flats between and merging with said curves.

12. In a machine of the class described, a rotary work spindle mounted for motion transverse to its axis, a work holder carried by said spindle, a tool in operative relation to work carried by said holder, means for moving said work spindle in said transverse direction, means for rotating said spindle, and means controlling such spindle motion in a cycle comprising intermittent rotary motions about the axis of said spindle and bodily motions thereof in curved and straight paths respectively, the curved and straight paths being such as to cause the line of engagement between said tool and work spindle to describe circular arcs each of a fractional part of a circle and said straight paths being such as to join the ends of adjacent arcs with straight line motions all forming a closed figure symmetrical about said spindle axis.

13. In a machine of the class described, a rotary work spindle mounted for motion transverse to its axis, a work holder carried by said spindle, a tool in operative relation to work carried by said holder, means for moving said work spindle in said transverse direction, means for rotating said spindle, and means controlling such spindle motion in a cycle comprising intermittent rotary motions about the axis of said spindle and bodily motions thereof in curved and straight paths respectively, the curved and straight paths being such as to cause the line of engagement between said tool and work spindle to describe circular arcs each of a fractional part of a circle and said straight paths being such as to join the ends of adjacent arcs with straight line motions all forming a closed figure symmetrical about said spindle axis, said tool being positioned to act on the outer periphery of work carried by said holder in cross sectional shape of said closed figure.

14. In a machine of the class described, a rotary work spindle mounted for motion transverse to its axis, a work holder carried by said spindle, a tool in operative relation to work carried by said holder, means for moving said work spindle in said transverse direction, means for rotating said spindle, and means, controlling such spindle motion in a cycle comprising intermittent rotary motions about the axis of said spindle and bodily motions thereof in curved and straight paths respectively, the curved and straight paths being such as to cause the line of engagement between said tool and work spindle to describe circular arcs each of a fractional part of a circle and said straight paths being such as to join the ends of adjacent arcs with straight line motions all forming a closed figure symmetrical about said spindle axis, said tool being positioned to act on the inner periphery of work carried by said holder in cross sectional shape of said closed figure.

PHILIP C. DURLAND.

REFERENCES CITED

The following references are of record in the file of this patent:

UNITED STATES PATENTS

| Number | Name | Date |
|---|---|---|
| 1,918,668 | Reusser | July 18, 1933 |
| 2,189,931 | Stubbs | Feb. 13, 1940 |
| 2,267,250 | Mossdorf | Dec. 23, 1941 |
| 2,415,062 | Green | Jan. 28, 1947 |

FOREIGN PATENTS

| Number | Country | Date |
|---|---|---|
| 417,612 | Great Britain | Oct. 9, 1934 |